United States Patent
Gritter et al.

(10) Patent No.: US 9,632,812 B1
(45) Date of Patent: Apr. 25, 2017

(54) COLLECTING DATA ASSOCIATED WITH VIRTUAL MACHINES FROM VARIOUS DATA SOURCES

(71) Applicant: Tintri Inc., Mountain View, CA (US)

(72) Inventors: Mark G. Gritter, Eagan, MN (US); Umesh Patil, Cupertino, CA (US); William Lim, Fremont, CA (US)

(73) Assignee: Trintri Inc., Mounatin View, CA (US)

( * ) Notice: Subject to any disclaimer, the term of this patent is extended or adjusted under 35 U.S.C. 154(b) by 0 days.

(21) Appl. No.: 14/709,332

(22) Filed: May 11, 2015

Related U.S. Application Data

(60) Provisional application No. 61/991,995, filed on May 12, 2014.

(51) Int. Cl.
  *G06F 9/455* (2006.01)

(52) U.S. Cl.
  CPC ............ *G06F 9/45558* (2013.01); *G06F 2009/45562* (2013.01); *G06F 2009/45591* (2013.01)

(58) Field of Classification Search
  CPC ......... G06F 9/5077; G06F 2009/45562; G06F 9/4558
  USPC ................................... 718/1, 104
  See application file for complete search history.

(56) References Cited

U.S. PATENT DOCUMENTS

| | | | | |
|---|---|---|---|---|
| 8,214,483 B2* | 7/2012 | Van Riel | ............ | G06Q 30/02 709/217 |
| 8,239,526 B2* | 8/2012 | Simpson | ............ | G06F 11/3409 709/224 |
| 8,326,803 B1* | 12/2012 | Stringham | ............ | G06F 3/067 707/652 |
| 8,799,709 B2* | 8/2014 | Iikura | ............ | G06F 11/1415 714/19 |
| 9,223,962 B1* | 12/2015 | Kashyap | ............ | G06F 21/566 |
| 2008/0208931 A1* | 8/2008 | Van Riel | ............ | G06Q 30/02 |
| 2010/0088699 A1* | 4/2010 | Sasaki | ............ | G06F 8/63 718/1 |
| 2012/0303739 A1* | 11/2012 | Ferris | ............ | H04L 67/06 709/217 |
| 2014/0052692 A1* | 2/2014 | Zhang | ............ | G06F 17/30088 707/639 |

* cited by examiner

*Primary Examiner* — Phillip H Nguyen
(74) *Attorney, Agent, or Firm* — Van Pelt, Yi & James LLP

(57) ABSTRACT

Collecting data associated with virtual machines from various data sources is disclosed, including: collecting data associated with a virtual machine from a data source of virtual machine data, where the data associated with the virtual machine is not currently tracked by a hypervisor; determining a set of related data associated with the virtual machine based at least in part on the data associated with the virtual machine collected from the data source of virtual machine data; storing associating data that associates the set of related data associated with the virtual machine; and providing access to the set of related data associated with the virtual machine based at least in part on the associating data.

20 Claims, 12 Drawing Sheets

| | File IDs | Location | Space Usage |
|---|---|---|---|
| VM 123 — Live Data | 10 | Vdisk A | 10 MB |
| | 12 | Vdisk A | 1 MB |
| | 13 | Vdisk B | 2 MB |
| | 14 | Vdisk B | 100 MB |
| Synthetic Data | 8 | Synthetic Vdisk | 900 MB |
| | 23 | Synthetic Vdisk | 490 MB |

FIG. 9D

COLLECTING DATA ASSOCIATED WITH VIRTUAL MACHINES FROM VARIOUS DATA SOURCES

CROSS REFERENCE TO OTHER APPLICATIONS

This application claims priority to U.S. Provisional Patent Application No. 61/991,995 entitled SYNTHETIC VIRTUAL MACHINES filed May 12, 2014 which is incorporated herein by reference for all purposes.

BACKGROUND OF THE INVENTION

In a virtual machine environment, a single virtual machine (VM) may comprise many storage components—its virtual disks, its configuration files, and its swap files, for example. These storage components may be separated in "space" (e.g., residing on different storage devices) or in "time" (e.g., an archived version of an older version of the VM may still exist) or both (e.g., a replica of the VM created for disaster recovery purposes). It would be desirable to monitor various separate components of a VM.

BRIEF DESCRIPTION OF THE DRAWINGS

Various embodiments of the invention are disclosed in the following detailed description and the accompanying drawings.

FIG. 9D is a diagram that shows an example presentation of the set of related data associated with the VM at a user interface.

DETAILED DESCRIPTION

Figure 1:
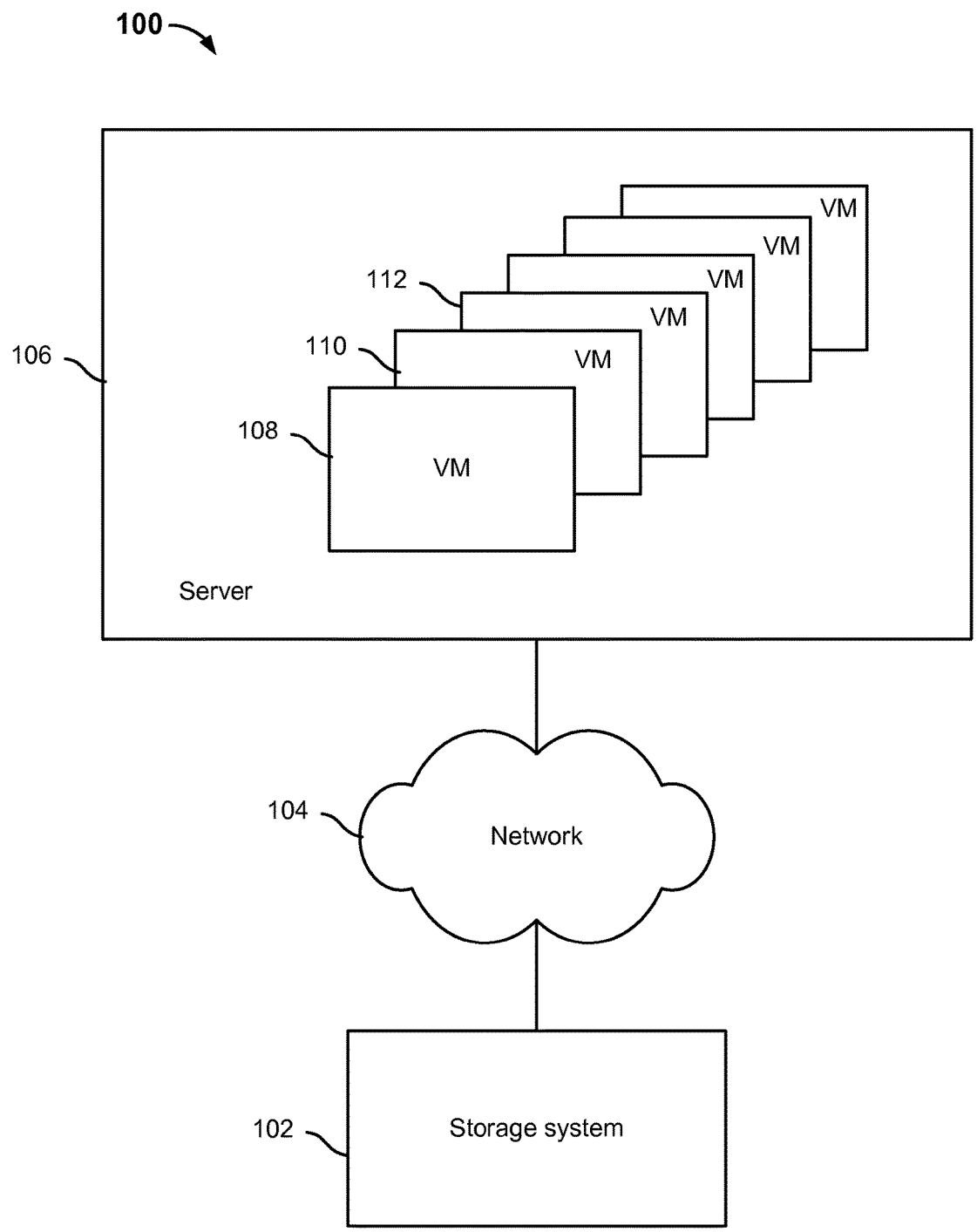
FIG. 1 is a diagram showing an embodiment of a storage system for the storage of virtual machines using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of collecting data associated with virtual machines from various data sources are described herein. In various embodiments, data associated with a virtual machine (which is sometimes referred to as a "VM") that is tracked by and/or is available from a hypervisor is referred to as "live data." As such, a VM whose data is tracked by and/or is available from a hypervisor is referred to as a "live VM." In some instances, a VM may have files and/or other data objects in addition to those that are tracked by a hypervisor. In various embodiments, VM data that is not currently tracked and/or is not currently available from a hypervisor but is retained by data sources other than a hypervisor is referred to as "synthetic data." Generally, synthetic data associated with a VM may be historical, distributed, or even misconfigured. Specific examples of types of synthetic data include VM replica information that is not known to a hypervisor, cached data associated with a VM that has been removed/deleted from a hypervisor's inventory, and a snapshot associated with a VM that has been removed/deleted from a hypervisor's inventory. In various embodiments, the synthetic data associated with a VM represents a synthesized state of the VM that is retained by the storage system. Data associated with this synthesized state is not available from a hypervisor like data associated with the VM's live state.

For example, reporting systems in hypervisor environments have probably retained information about VMs that are deleted in order to do monthly usage reports or chargeback. Similarly, clustered storage systems report aggregate performance statistics and capacity statistics, at the level of the cluster or volume. Some storage systems may list the virtual machines available within a particular array (volume) snapshot, but not as first-class objects.

In various embodiments, a set of related data associated with a VM is aggregated from one or more data sources of VM data that are not hypervisors. In various embodiments, the set of related data associated with a VM comprises synthetic data associated with the VM. In some embodiments, the set of related data associated with the VM further includes live data (if any) associated with the VM that is aggregated from one or more hypervisor data sources. In various embodiments, associating data that associates the set of related data associated with the VM is stored. For example, the associating data comprises a set of metadata associated with the VM. In various embodiments, access is provided to the set of related data associated with the VM at a user interface. The set of related data associated with the VM comprises live and/or synthetic data associated with the VM and represents a holistic state of the VM across data retained by a storage system and data that is tracked by one or more hypervisors. For example, a presentation at the user interface of the set of related data associated with a VM could enable an administrator user to better comprehend the full extent to which the VM consumes resources (e.g., utilizes storage space) and/or enable the administrator user to perform uniform operations (e.g., cloning, deletion, migration, etc.) with respect to all components of a VM at once.

In various embodiments, the set of related data associated with a VM ties distributed state together in an existing abstraction, the virtual machine, rather than introducing a new abstraction requiring a separate user interface. It ties together multiple problems into a single solution rather than introducing new abstractions.

FIG. 1 is a diagram showing an embodiment of a storage system for the storage of virtual machines using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the filesystem for the storage of virtual machines (VMs) using virtual machine storage abstractions does not include network 104, and storage system 102 is a component of server 106. In some embodiments, server 106 is configured to communicate with other storage systems in addition to storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (which are also sometimes referred to "vdisks") and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files, and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store metadata identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either hard disk or solid state disk, or a combination of hard disk and solid state disk.

In some embodiments, one or more hypervisors (not shown) manage the VMs running on server 106. In some embodiments, the one or more hypervisors are located at server 106. In some embodiments, the one or more hypervisors are located on another server that is in communication with server 106. In some embodiments, storage system 102 includes communication with the one or more hypervisors that manage the VMs running on server 106.

As will be described in further detail below, storage system 102 is configured to collect VM data associated with one or more VMs from various data sources of VM data. In some embodiments, at least one data source of VM data of the various data sources of VM data is a hypervisor that manages at least a VM running on server 106. As mentioned above, the VM data associated with a VM that is collected from a hypervisor is referred to as "live data." In various embodiments, at least one data source of VM data of the various data sources of VM data is not a hypervisor. For example, a data source that is not a hypervisor is the filesystem at storage system 102, which may store at least some VM data that is not available from a hypervisor that manages the VMs. As mentioned above, the VM data associated with a VM that is collected from a non-hypervisor data source is referred to as "synthetic data." In various embodiments, storage system 102 is configured to merge together the live and/or synthetic VM data collected from the various data sources of VM data for each VM as a set of related data associated with that VM. For example, the set of related data associated with a VM comprises a set of metadata associated with the VM. In some embodiments, the set of related data associated with a VM comprises static attributes (e.g., identifiers of data objects) and dynamic attributes (e.g., performance and capacity statistics). For example, the static attributes of the set of related data associated with the VM include an identifier of the VM, an identifier of a vdisk of the VM, the association of the VM to a particular hypervisor identifier/name (if any) or multi-VM application, and identifiers of (local) file identifiers (IDs) that are associated with the VM. For example, the dynamic attributes of the set of related data associated with the VM include performance and capacity statistics of the live data associated with the VM, performance and capacity statistics for a snapshot associated with the VM, performance and capacity statistics for an ongoing replication of the VM, and whether the VM or a file thereof is still present. Storage system 102 can present the set of related data associated with a VM at a user interface to enable a user to view the overall state of the VM.

For example, when a VM has array-level snapshots but its live version has been deleted from the managing hypervisor, the storage space occupied by those snapshots can be shown as synthetic data associated with that VM as a user interface. In some embodiments, an "array-level snapshot" is a snapshot that is created by the storage system (e.g., storage system 102). In some embodiments, snapshots may also be created outside the storage system, for example, by a hypervisor. In some embodiments, even if all the stored data (including snapshots) associated with a VM is deleted from the storage system, the VM is continued to be shown as a "historical" object with a performance history at the user interface, for reporting purposes.

For example, when a VM is replicated from one storage system to another, the space and incoming replication statistics of the VM on the destination storage system can be presented at the user interface.

In various embodiments, the presence of per-VM snapshots and replication enables associating the associated state (e.g., space consumption, replication throughput, and performance data) to an individual VM rather than to a volume as a whole. It may not be desirable to have a "synthetic volume" if volumes are rarely moved or deleted.

For example, when a VM has been removed from a managing hypervisor's inventory, but its files are still live on the disk of the storage system (e.g., storage system 102), the presence of those files can be shown as synthetic data associated with that VM at a user interface. Similarly, in some embodiments, if a VM has been deleted on disk but still remains in hypervisor inventory, the VM can be shown as a different type of synthetic VM.

For example, in some hypervisor environments such as OpenStack, there may be storage objects (e.g., volumes) that are not currently bound to a VM. In some embodiments, these can be shown as synthetic data associated with a VM for space accounting. Also, in some embodiments, in a model where individual real VMs are not the primary objects of interest, a set of related data associated with a VM can be created to show the overall state and resource consumption of an entire application. The true state of an application is stored in persistent volumes and thus it is more important to show the aggregate statistics for the set of volumes than the particular VM instances those volumes are bound to at the moment.

The set of related data associated with a VM works across multiple hypervisors as naturally as one hypervisor. In various embodiments, the set of related data associated with a VM provides a linearizable history of the VM. A VM may exist on different storage systems at different points in its life, or may even switch from one hypervisor to another. But if it is the same VM from the user's point of view, the synthesized performance history behaves as if the VM was a single continuous entity.

Figure 2:
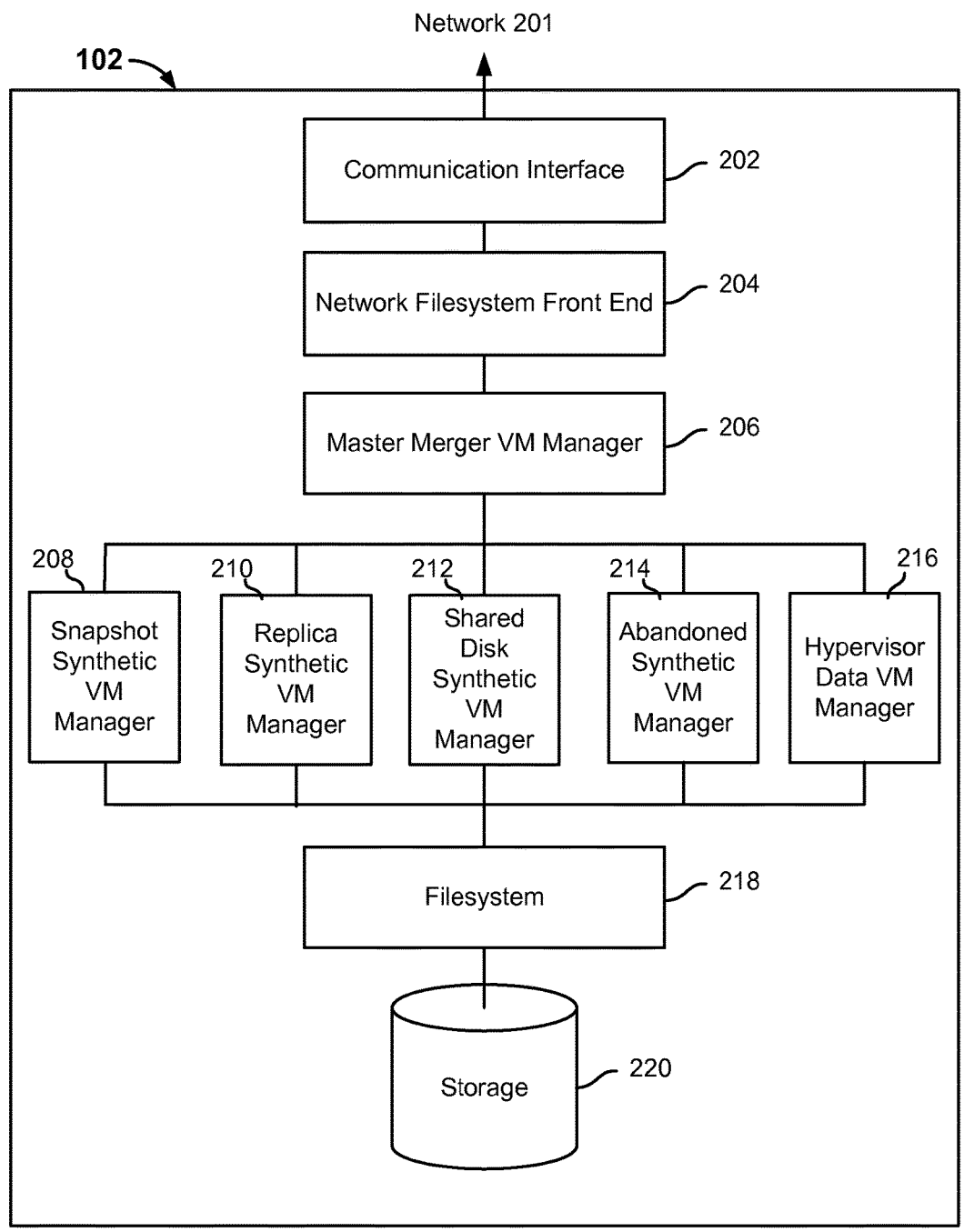
FIG. 2 is a block diagram illustrating an embodiment of a storage system including data and metadata.

FIG. 2 is a block diagram illustrating an embodiment of a storage system including data and metadata. In the example shown, storage system 102 includes a network connection 201 and a communication interface 202, such as a network interface card or other interface, which enable the storage system to be connected to and communicate via a network such as network 104 of FIG. 1. Storage system 102 further includes network filesystem front end 204, connected to filesystem 218, configured to handle NFS requests from virtual machines running on systems such as server 106 of FIG. 1. In various embodiments, network filesystem front end 204 is configured to associate NFS requests as received and processed with a corresponding VM and/or virtual disk (vdisk) with which the request is associated, for example, using metadata stored at persistent storage 220 or elsewhere.

Storage system 102 further includes master merger VM manager 206, snapshot synthetic VM manager 208, replica synthetic VM manager 210, shared disk synthetic VM manager 212, abandoned synthetic VM manager 214, and hypervisor data VM manager 216. Each of master merger VM manager 206, snapshot synthetic VM manager 208, replica synthetic VM manager 210, shared disk synthetic VM manager 212, abandoned synthetic VM manager 214, and hypervisor data VM manager 216 can be implemented using software, hardware, or a combination of software and hardware.

Hypervisor data VM manager 216 is configured to collect live data associated with one or more VMs from a hypervisor (not shown). In some embodiments, hypervisor data VM manager 216 is configured to collect live data from a hypervisor periodically and/or in response to a detected event (e.g., an update made by the hypervisor to a VM). Examples of types of hypervisors include VMware, Red Hat Enterprise Virtualization, and Hyper-V. For example, hypervisor data VM manager 216 is configured to collect data associated with one or more VMs from a single type of hypervisor or multiple types of hypervisors. In some embodiments, hypervisor data VM manager 216 is configured to call the API associated with a hypervisor, receive configuration files from the hypervisor, and parse the configuration files to determine the live data associated with each VM. Examples of live data associated with each VM include static attributes (e.g., identifiers used to describe the VM or a vdisk thereof, identifiers of data objects included in the live data associated with the VM, the association between the VM and the identifier of the hypervisor) and dynamic attributes (e.g., performance and capacity statistics of data objects included in the live data associated with the VM). In some embodiments, storage system 102 includes one or more instances of a hypervisor data VM manager collecting data from a corresponding type of one or more hypervisor types. In some embodiments, collected live data associated with each particular VM is associated with that VM's universal unique identifier (UUID). In some embodiments, a VM's UUID is assigned by a storage system such as storage system 102 or by a hypervisor.

Each of snapshot synthetic VM manager 208, replica synthetic VM manager 210, shared disk synthetic VM manager 212, and abandoned synthetic VM manager 214 is configured to collect a type of synthetic data associated with one or more VMs from a corresponding data source that is not a hypervisor. A description of each synthetic VM manager is as follows:

Snapshot synthetic VM manager 208 is configured to query filesystem 218 for snapshot data associated with one or more VMs stored at storage 220. In some embodiments, a snapshot associated with a VM may be generated by a hypervisor or by storage system 102. In various embodiments, a snapshot associated with a VM includes (e.g., refers to locations in storage of) the files associated with the VM at the time that the snapshot was generated. In various embodiments, snapshot data associated with a VM includes static attributes (e.g., identifiers used to describe the VM or a vdisk thereof, identifiers of data objects included in a snapshot of the VM) and dynamic attributes (e.g., performance and capacity statistics for a snapshot of the VM). In some embodiments, collected snapshot data associated with each particular VM is associated with that VM's UUID.

Replica synthetic VM manager 210 is configured to query filesystem 218 for incoming replica data associated with one or more VMs that are being replicated to storage system 102 (i.e., storage system 102 is the destination of the replication of these VMs). In some embodiments, if a VM is still live (e.g., data associated with the VM is available from a hypervisor), then incoming replication of the VM is not permitted at storage system 102. In some embodiments, the replica data associated with a VM that is being replicated to storage system 102 is associated with an ongoing replication. The replication produces a copy of the data in the live VM, stored as snapshots. This is usually an ongoing process (as more snapshots are taken, more replication will be done) but it could be a one-time event as well. Until the first snapshot has completely arrived, the state on the destination storage system comprises (1) (hidden) files to which replicated data is being written and (2) metadata within the file system itself related to the incoming network connection, status and performance of the replication protocol, and the identity of the incoming VM. After the first snapshot has completed, all those pieces of state are still present, but the information in the snapshot metadata is also available to work with. In some embodiments, replica synthetic VM manager 210 is configured to query filesystem 218 periodically or in response to an event (e.g., the start of replication of a VM to storage system 102). The replica data associated with the ongoing replication of a VM may not include a snapshot associated with the VM (e.g., because a snapshot has not been generated for the VM and/or has not yet been replicated at storage system 102). In some embodiments, outgoing replica data associated with a VM that is to be replicated at a storage system other than storage system 102 does not need to be collected. In some embodiments, the replica data associated with a VM includes stored information in an incoming replication configuration. Examples of stored information in an incoming replication configuration include a user given name of a VM, a VM UUID, a hypervisor given VM identifier, and/or a time at which the snapshot was taken. In various embodiments, replica data associated with a VM includes static attributes (e.g., identifiers used to describe the VM or a vdisk thereof, identifiers of data objects included in the replica data of the VM) and dynamic attributes (e.g., performance and capacity statistics for the replica data of the VM). In some embodiments, collected replica data associated with each particular VM is associated with that VM's UUID.

Shared disk synthetic VM manager 212 is configured to post process the information collected by hypervisor data VM manager 216 by identifying files which belong to multiple VMs and presenting each of those files as a different synthetic VM. This situation can arise when, for example, many virtual desktops are created from the same "base disk" (or disks) holding the shared operation system and applications.

The following describes an example in which a file, file1, that belongs to multiple VMs can be identified and for which a synthetic VM can be created:
VM1→disk A→file1, file2
VM2→disk B→file1, file3

In this example, shared disk synthetic VM manager 212 notices that file1 is referenced multiple times and creates a synthetic VM:
shared disk VM for "file 1"→synthetic disk→file 1

Identifying files that belong to multiple VMs and then creating a synthetic VM for each such file ensures that storage operations and statistics on the shared file are not performed/counted multiple times, nor omitted, nor associated with an unpredictable VM (e.g., one of VM1 or VM2 "at random").

Abandoned synthetic VM manager 214 is configured to query filesystem 218 for cached data associated with one or more VMs that are stored at storage 220. In some embodiments, abandoned synthetic VM manager 214 is configured to query filesystem 218 periodically or in response to an event (e.g., the deletion of a VM by a hypervisor). In some embodiments, cached data is associated with VMs that have been removed from a hypervisor's inventory. In various embodiments, the cached data was obtained from the hypervisor and is associated with VMs that were previously listed in the hypervisor's inventory but have since become absent. In some embodiments, the cached data is maintained at storage 220 based on a caching policy (e.g., the cached data associated with a VM that is deleted from a hypervisor is maintained for one week after the deletion). In various embodiments, cached data associated with a VM includes static attributes (e.g., identifiers used to describe the VM or a vdisk thereof, identifiers of data objects included in the cached data of the VM) and dynamic attributes (e.g., performance and capacity statistics for the cached data of the VM). In some embodiments, collected cached data associated with each particular VM is associated with that VM's UUID.

In actual implementation, other and/or different data types of synthetic data associated with VMs other than the snapshot data, replica data, shared disk data, and cached data, such as those described above, may be collected by respective synthetic VM managers at a storage system such as storage system 102.

Master merger VM manager 206 is configured to receive and merge together the live data (if any) associated with a VM collected by hypervisor data VM manager 216 and also the synthetic data associated with the VM from snapshot synthetic VM manager 208, replica synthetic VM manager 210, shared disk synthetic VM manager 212, and abandoned synthetic VM manager 214. In some embodiments, master merger VM manager 206 is configured to receive and merge together live and/or synthetic data associated with a VM from the various data sources periodically or in response to an event (e.g., a received indication to present VM state at a user interface). Master merger VM manager 206 is configured to identify the received live and/or synthetic data that is associated with each VM using that VM's UUID. Master merger VM manager 206 is configured to determine whether the aggregated live and/or synthetic data associated with each VM includes any conflicts. In some embodiments, a conflict exists when inconsistent data (e.g., different versions of the same file) is collected from two different data sources. As will be described in further detail below, in the event that a conflict exists, master merger VM manager 206 is configured to resolve the conflict by maintaining the data associated with a more preferred data type from the data associated with the conflict in the set of related data (e.g., and discarding the data associated with the less preferred data type associated with the conflict) using data type preference data (e.g., stored at storage 220). For example, the data type preference data comprises a list of data types ordered by their respective preference/priority. In various embodiments, a data type of a data describes the data source from which it was collected. For example, the data type of "live data" is collected from a hypervisor, the data type of "snapshot data" is collected from a snapshot, the data type of "replica data" is collected from an incoming replication configuration, the data type of "shared disk data" is collected from a storage, and the data type of "abandoned data" is collected from cached data. For example, the data type preference data may indicate that live data is to be selected over any type of synthetic data and that if live data is not available, then snapshot data is to be selected over any other type of synthetic data, and so forth. After resolving any conflicts, master merger VM manager 206 is configured to store the remaining aggregated live and/or synthetic data associated with a VM as a set of related data associated with that VM at storage 220. For example, the set of related data associated with a VM is stored with that VM's UUID. In some embodiments, the set of related data associated with a VM comprises underlying data and/or metadata. In some embodiments, the set of related data associated with the VM includes an identifier of the VM, an identifier of a vdisk of the VM, the association of the VM to a particular hypervisor identifier/name (if any) or multi-VM application, identifiers of (local) files that are associated with the VM, performance and capacity statistics of the live data associated with the VM, performance and capacity statistics for a snapshot associated with the VM, performance and capacity statistics for an ongoing replication of the VM, and whether the VM or a file thereof is still present. Storage system 102 can present the set of related data associated with a VM at a user interface to enable a user to view the overall state of the VM.

Storage 220 stores sets of related data associated with respective VMs. In some embodiments, in response to a request received at storage system 102 to present VM states, the sets of related data associated with respective VMs are retrieved and to be presented at a user interface. For example, at the user interface, the live data (if any) and the synthetic data associated with each VM are simultaneously presented so that the viewing user may see all components of a VM, not just those that are known to a hypervisor. In some embodiments, in response to a request received at storage system 102 to perform an action (e.g., deletion, migration, clone) with respect to a VM, the set of related data associated with the VM's VM ID is retrieved from storage 220 and used to identify all the components of the VM, including those components that are tracked by a hypervisor and those that are not, with which the action is to be performed. The requested action can be performed on all the live and/or synthetic components of the VM using the set of related data associated with the VM's VM ID.

Figure 3:
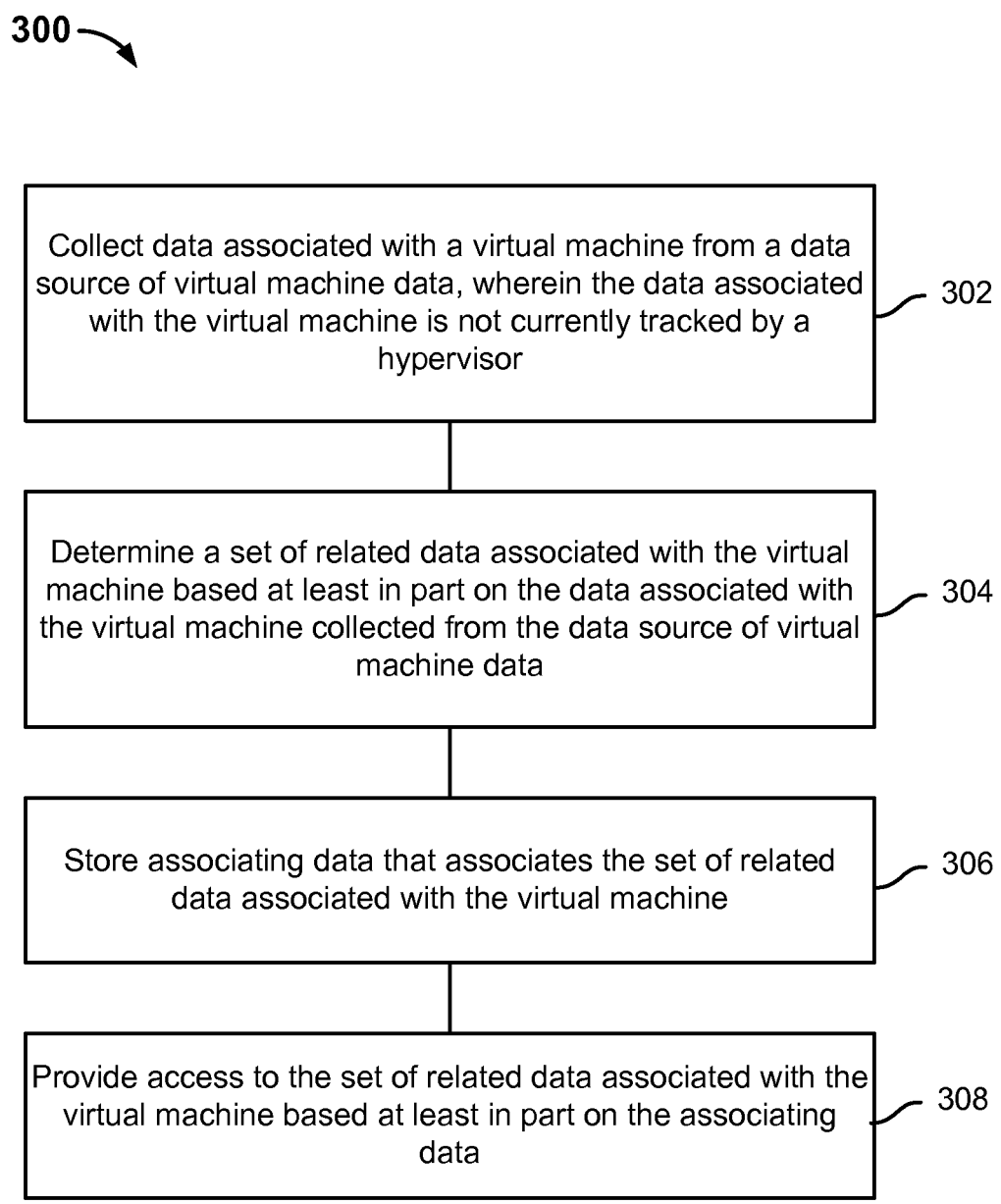
FIG. 3 is a flow diagram showing an embodiment of a process for determining a set of related data associated with a VM.

FIG. 3 is a flow diagram showing an embodiment of a process for determining a set of related data associated with a VM. In some embodiments, process 300 is implemented at a storage system such as storage system 102 of system 100 of FIG. 1.

At 302, data associated with a virtual machine is collected from a data source of virtual machine data, wherein the data associated with the virtual machine is not currently tracked by a hypervisor.

The virtual machine (VM) may or may not currently be in the inventory of a hypervisor. Regardless of whether the VM is currently in the inventory of a hypervisor, data sources other than the hypervisor may store data associated with the VM. In particular, at least some of the data associated with the VM that is stored by a non-hypervisor data source is not tracked, maintained, known to, and/or otherwise currently referenced by a hypervisor. As described above, data associated with the VM that is stored by a non-hypervisor data source is not tracked, maintained, known to, and/or otherwise currently referenced by a hypervisor is referred to as "synthetic data" associated with the VM. Synthetic data associated with the VM that is not tracked, maintained, known to, and/or otherwise currently referenced by a hypervisor is collected from at least one of such data sources. Examples of such data sources include a configuration management tool or orchestration service (e.g., Puppet, Chef, or Ansible, etc.) of a storage system, a local cache of a storage system, a filesystem of a storage system, snapshots stored at a storage system, and stored information in a replication configuration incoming into a storage system. In some embodiments, such a data source that stores synthetic data that is not currently tracked by a hypervisor can be contacted via a query or an API call, for example. Examples of types of synthetic data associated with a VM that are not currently tracked by a hypervisor include snapshot data that is associated with the VM, replica data associated with the VM, shared disk data associated with the VM, and cached data associated with the VM. In some embodiments, the collected synthetic data associated with the VM includes static attributes (e.g., identifiers of data objects) and dynamic attributes (e.g., performance and capacity statistics).

At 304, a set of related data associated with the virtual machine is determined based at least in part on the data associated with the virtual machine collected from the data source of virtual machine data. The synthetic data associated with a VM that is not currently tracked by a hypervisor, which is collected from one or more data sources that are not hypervisors, is merged together to form a set of synthetic data associated with the VM.

In various embodiments, live data associated with the VM that is tracked by a hypervisor is also collected. In some embodiments, the collected live data associated with the VM includes static attributes (e.g., identifiers of data objects) and dynamic attributes (e.g., performance and capacity statistics). As described above, data associated with the VM that is tracked by a hypervisor is referred to as "live data" associated with the VM. In some embodiments, if live data associated with the VM that is tracked by a hypervisor can be collected and/or is otherwise available from the hypervisor, the live data is merged with the synthetic data associated with the VM. However, it is possible for a VM to not be associated either live data or synthetic data.

In some embodiments, data associated with a particular VM is associated with that VM's UUID. As such, data associated with the particular VM that is collected from different data sources is identified as being related to the same VM based on their association with the same VM UUID.

In some embodiments, if any conflicts (e.g., inconsistent data) are found in the live and/or synthetic data associated with the VM as they are being merged, then stored data type preference data is used to resolve such conflicts.

At 306, associating data that associates the set of related data associated with the virtual machine is stored.

The set of related data, which includes live and/or synthetic data, associated with a VM is stored in a manner that associates the set of related data together. For example, the set of related data associated with the VM can be stored in a data structure associated with the VM. In another example, the set of related data associated with the VM can be stored in a special object associated with the VM. In some embodiments, the set of related data is stored with the VM's UUID.

At 308, access to the set of related data associated with the virtual machine is provided based at least in part on the associating data.

In various embodiments, access to the set of related data associated with the VM can be provided in the event that an overall state of the VM, including live data and synthetic data, is to be presented at a user interface. For example, presenting the set of related data associated with the VM at a user interface comprises simultaneously presenting the live data (if any) and the synthetic data associated with the VM so that a viewing user can have a complete understanding of which live and/or synthetic components of the VM exist on the storage system and how the various live and/or synthetic components of the VM consume resources storage resources.

In a first example, the viewing user may discover that while a live VM has been recently deleted from a hypervisor's list of active VMs (e.g., due to a user input to "delete the VM from disk" and the hypervisor does not finish deleting, or due to a user input to "remove the VM from the hypervisor's inventory," which the hypervisor does not even attempt to delete), the files previously associated with the live VM are still stored at the storage system and are utilizing significant storage.

In a second example, the viewing user may discover that while the VM has been deleted from a hypervisor, snapshots associated with the no longer live VM are still stored at the storage system and are utilizing significant storage.

Figure 4:
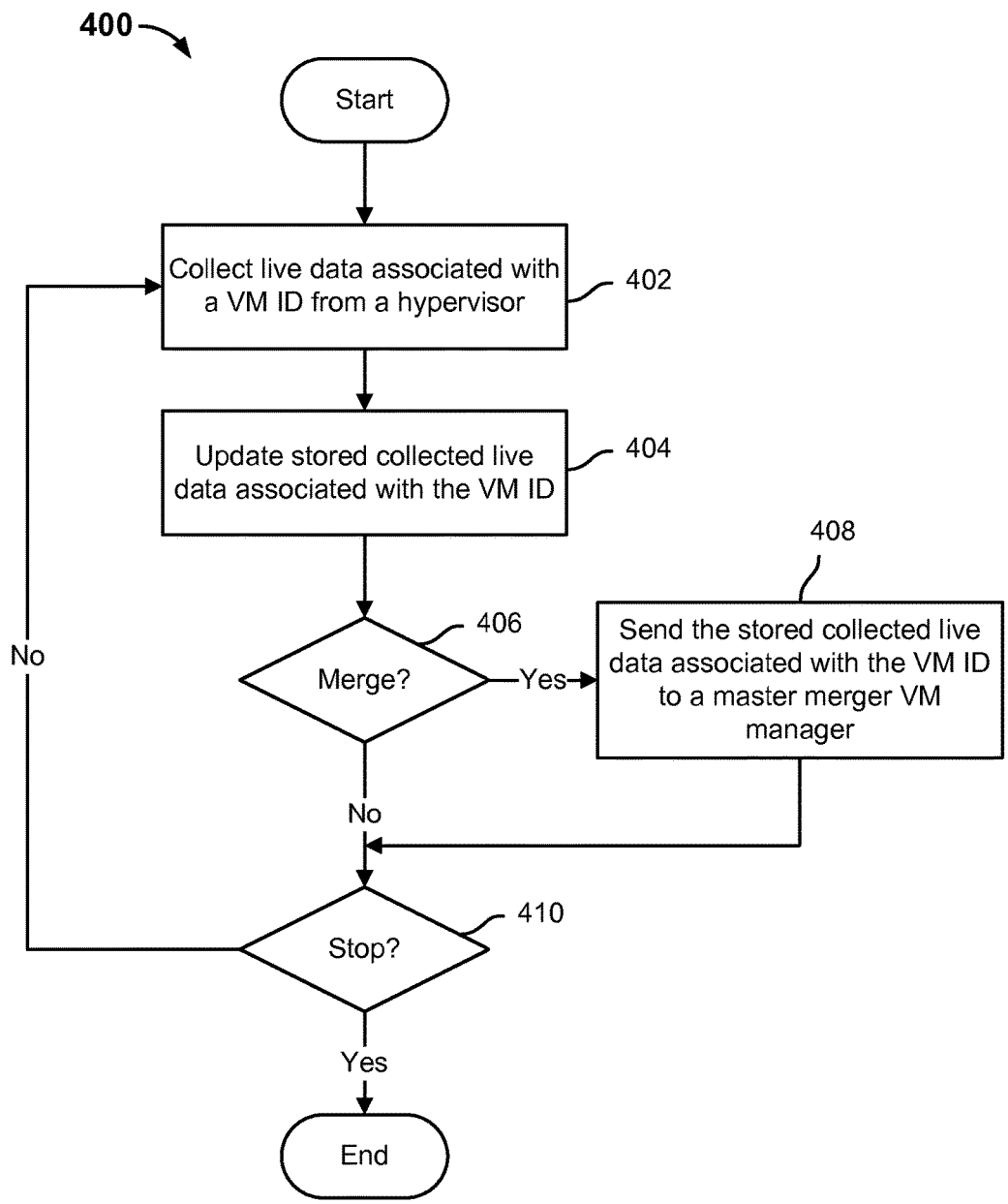
FIG. 4 is a flow diagram showing an embodiment of a process of collecting live data associated with a VM from a hypervisor.

FIG. 4 is a flow diagram showing an embodiment of a process of collecting live data associated with a VM from a hypervisor. In some embodiments, process 400 is implemented at a storage system such as storage system 102 of system 100 of FIG. 1. In some embodiments, process 400 is implemented by a hypervisor data VM manager such as hypervisor data VM manager 216 of storage system 102 of FIG. 2.

In some embodiments, process 400 is performed for each instance of each type of hypervisor. Example types of hypervisors include VMware, Red Hat Enterprise Virtualization, and Hyper-V. For example, if there were two instances of VMware hypervisors and one instance of a Hyper-V hypervisor that were running to manage VMs, then three instances of process 400 can be performed to collect live VM data from the corresponding three instances of hypervisors.

At 402, live data associated with a VM ID is collected from a hypervisor. If a VM is in a hypervisor's inventory, then the VM is considered to be live and the hypervisor could manage live data associated with the VM. In some embodiments, current live data associated with one or more VMs is obtained from the hypervisor via an API call. In some embodiments, the live data associated with the one or more VMs is included in hypervisor configuration files, which are parsed to extract the VM data. In some embodiments, the live data associated with each VM is associated with that VM's VM identifier (ID). In some embodiments, the VM ID comprises a VM UUID. Examples of live data associated with each VM ID include static attributes (e.g., identifiers used to describe the VM or a vdisk thereof, identifiers of data objects included in the live data associated with the VM, the association between the VM and the identifier of the hypervisor) and dynamic attributes (e.g., performance and capacity statistics of data objects included in the live data associated with the VM).

At 404, stored collected live data associated with the VM ID is updated. If previously collected live data associated with a VM ID has already been stored, then the previously stored live data is updated with the current live data that was collected at 402.

At 406, it is determined whether the stored collected live data is to be merged with other collected data associated with the VM ID. One example of other data associated with the VM ID with which the collected live data is to be merged is live data associated with the VM ID that was collected from another type of hypervisor or another instance of the same type of hypervisor. Another example of other data associated with the VM ID with which the collected live data is to be merged is synthetic data associated with the VM ID that was collected from a data source that is not a hypervisor.

For example, the stored collected live data is to be merged with other data associated with the VM ID at every predetermined interval and/or in response to an event that triggers such a merge. In the event that the stored collected live data is to be merged with other data associated with the VM ID, control is transferred to 408. Otherwise, in the event that the stored collected live data is not to be merged with other data associated with the VM ID, control is transferred to 410.

At 408, the stored collected live data associated with the VM ID that is to be merged with other data associated with the VM ID is sent to a master merger VM manager. The master merger VM manager (e.g., master merger VM manager 206 of storage system 102 of FIG. 2) is configured to merge together live and/or synthetic data associated with the VM ID that has been collected from various data sources to determine a set of related data associated with the VM ID.

At 410, it is determined whether process 400 is to be stopped. For example, process 400 is to be stopped in the event that the live data associated with the VM ID is no longer desired to be collected from the hypervisor and/or the storage system is shut down. In the event that process 400 is to be stopped, process 400 ends. Otherwise, in the event that process 400 is not to be stopped, control is transferred back to 402, to repeat process 400 again.

Figure 5:
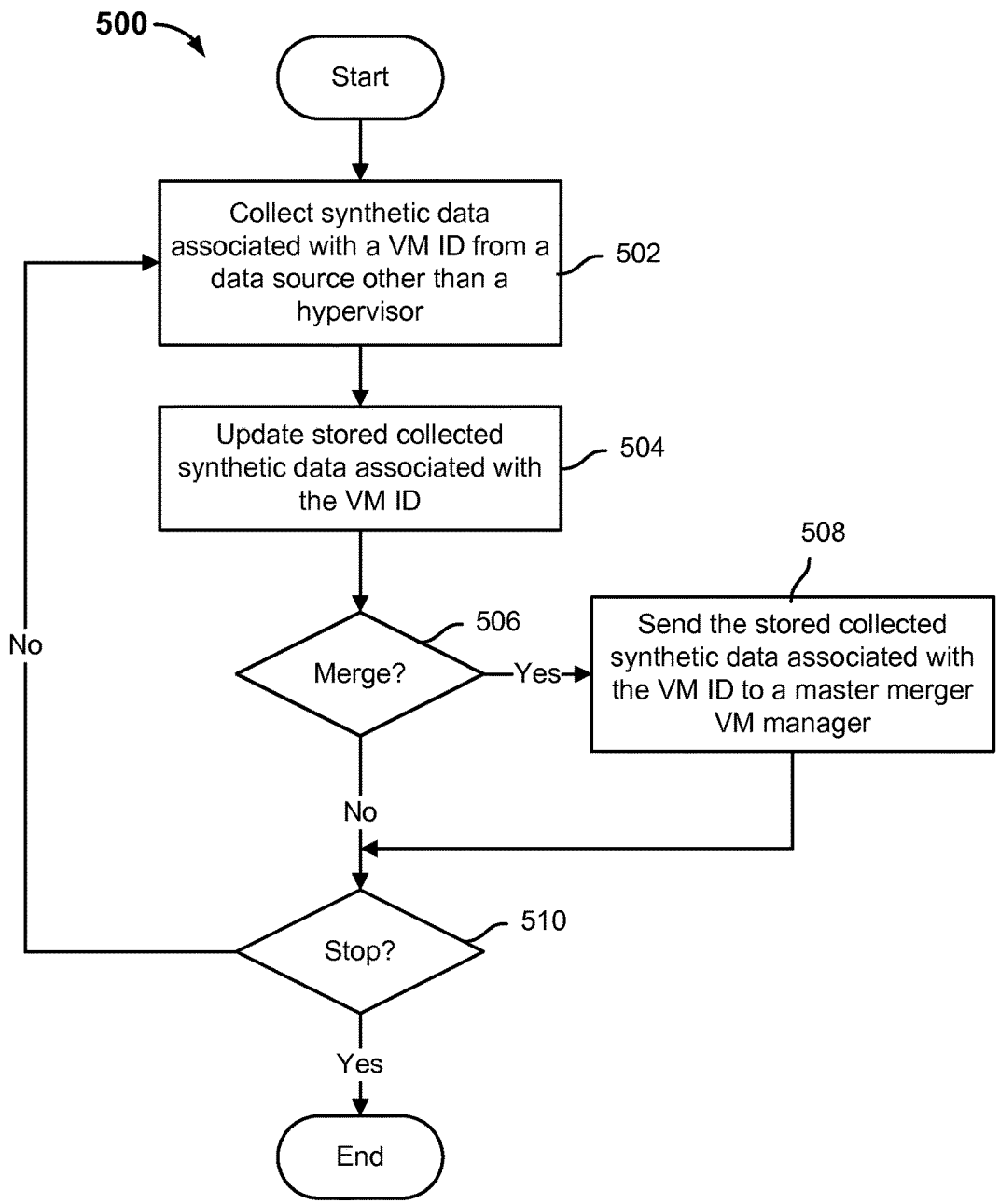
FIG. 5 is a flow diagram showing an embodiment of a process of collecting synthetic data associated with a VM from a data source other than a hypervisor.

FIG. 5 is a flow diagram showing an embodiment of a process of collecting synthetic data associated with a VM from a data source other than a hypervisor. In some embodiments, process 500 is implemented at a storage system such as storage system 102 of system 100 of FIG. 1.

In some embodiments, process 500 can be used to collect synthetic data associated with a VM from any data source that is not a hypervisor. For example, process 500 can be performed for each type of data source that is not a hypervisor. In some embodiments, process 500 is implemented by a snapshot synthetic VM manager such as snapshot synthetic VM manager 208 of storage system 102 of FIG. 2 to collect snapshot data associated with a VM. In some embodiments, process 500 is implemented by a replica synthetic VM manager such as replica synthetic VM manager 210 of storage system 102 of FIG. 2 to collect replica data associated with a VM. In some embodiments, process 500 is implemented by a shared disk synthetic VM manager such as shared disk synthetic VM manager 212 of storage system 102 of FIG. 2 to collect shared disk data associated with a VM. In some embodiments, process 500 is implemented by an abandoned synthetic VM manager such as abandoned synthetic VM manager 214 of storage system 102 of FIG. 2 to collect abandoned synthetic data associated with a VM.

At 502, synthetic data associated with a VM ID is collected from a data source other than a hypervisor. Regardless if a VM is in a hypervisor's inventory, synthetic data associated with the VM may be stored at and therefore collected from a data source that is not the hypervisor. In some embodiments, synthetic data associated with one or more VMs is obtained from a non-hypervisor data source. Examples of non-hypervisor data sources include a configuration management tool or orchestration service of a storage system, a local cache of a storage system, a filesystem of a storage system, snapshots stored at a storage system, and stored information in a replication configuration incoming into a storage system. In some embodiments, the synthetic data associated with each VM is associated with that VM's VM ID. In some embodiments, the VM ID comprises a VM UUID. Examples of synthetic data associated with each VM ID include static attributes (e.g., identifiers used to describe the VM or a vdisk thereof or identifiers of data objects included in the synthetic data associated with the VM) and dynamic attributes (e.g., performance and capacity statistics of data objects included in the synthetic data associated with the VM).

At 504, stored collected synthetic data associated with the VM ID is updated. If previously collected synthetic data associated with a VM ID has already been stored, then the previously stored synthetic data is updated with the current synthetic data that was collected at 502.

At 506, it is determined whether the stored collected synthetic data is to be merged with other collected data associated with the VM ID. One example of other data associated with the VM ID with which the collected synthetic data is to be merged is live data associated with the VM ID that was collected from a hypervisor. Another example of other data associated with the VM ID with which the collected synthetic data is to be merged is synthetic data associated with the VM ID that was collected from another data source that is not a hypervisor.

For example, the stored collected synthetic data is to be merged with other data associated with the VM ID at every predetermined interval and/or in response to an event that triggers such a merge. In the event that the stored collected synthetic data is to be merged with other data associated with the VM ID, control is transferred to 508. Otherwise, in the event that the stored collected synthetic data is not to be merged with other data associated with the VM ID, control is transferred to 510.

At 508, the stored collected synthetic data associated with the VM ID that is to be merged with other data associated with the VM ID is sent to a master merger VM manager. The master merger VM manager (e.g., master merger VM manager 206 of storage system 102 of FIG. 2) is configured to merge together live and/or synthetic data associated with the VM ID that has been collected from various data sources to determine a set of related data associated with the VM ID.

At 510, it is determined whether process 500 is to be stopped. For example, process 500 is to be stopped in the event that the synthetic data associated with the VM ID is no longer desired to be collected from the particular non-hypervisor data source from which process 500 collected data and/or the storage system is shut down. In the event that process 500 is to be stopped, process 500 ends. Otherwise, in the event that process 500 is not to be stopped, control is transferred back to 502, to repeat process 500 again.

Figure 6:
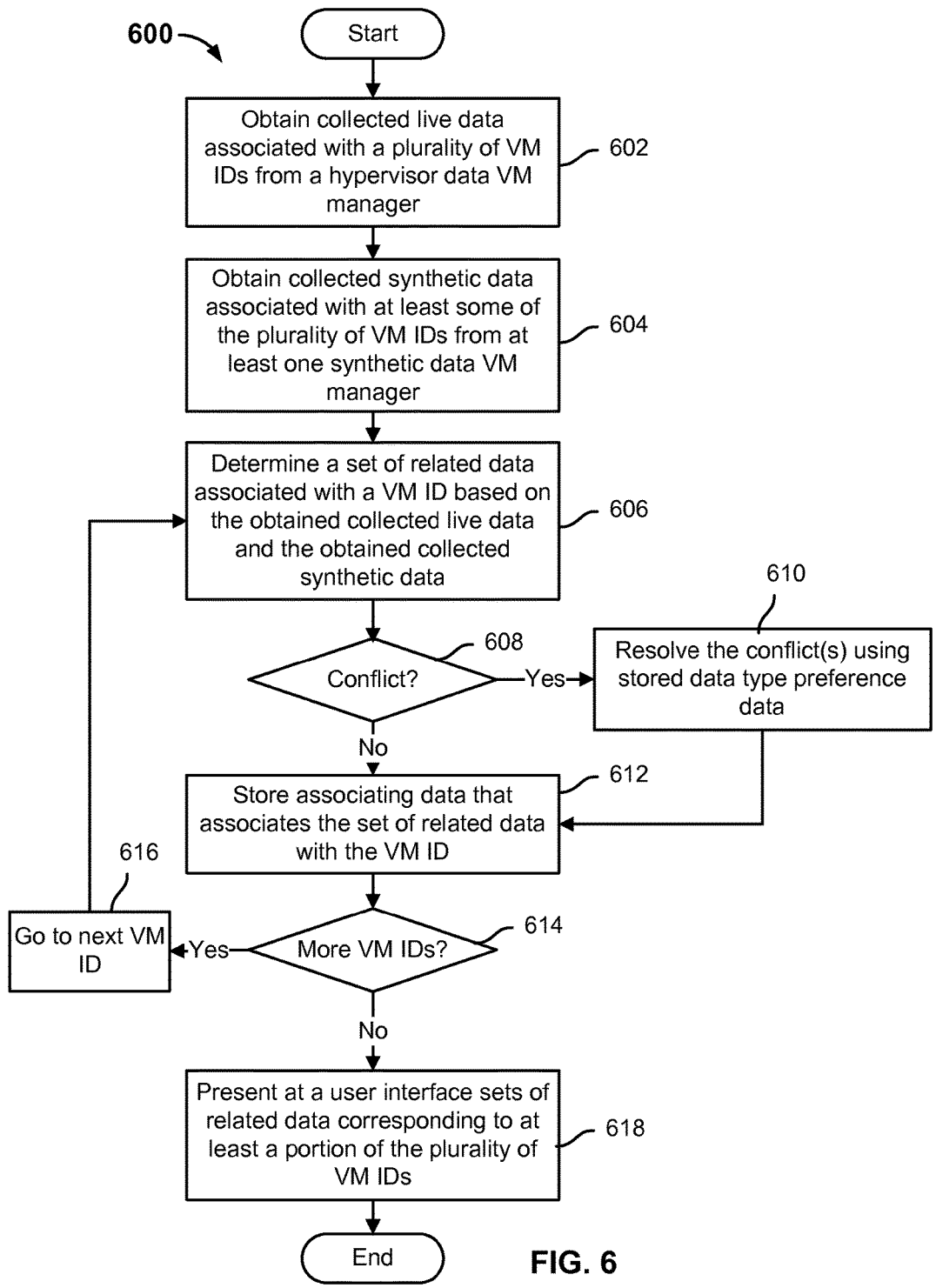
FIG. 6 is a flow diagram showing an embodiment of a process of merging collected live data and synthetic data associated with VMs.

FIG. 6 is a flow diagram showing an embodiment of a process of merging collected live data and synthetic data associated with VMs. In some embodiments, process 600 is implemented at a storage system such as storage system 102 of system 100 of FIG. 1. In some embodiments, process 600 is implemented by a master merger VM manager such as master merger VM manager 206 of storage system 102 of FIG. 2. In some embodiments, step 304 of process 300 of FIG. 3 is implemented, at least in part, using process 600.

At 602, collected live data associated with a plurality of VM IDs is obtained from a hypervisor data VM manager. Live data associated with a plurality of VM IDs is received from one or more hypervisor data VM managers. In some embodiments, each of the hypervisor data VM managers is implemented using the example of hypervisor data VM manager 216 of storage system 102 of FIG. 2.

At 604, collected synthetic data associated with at least some of the plurality of VM IDs is obtained from at least one synthetic data VM manager. Synthetic data associated with at least some of the plurality of VM IDs is received from one or more synthetic data VM managers. Different types of synthetic data may be received from different synthetic data MV managers. In some embodiments, examples of synthetic data VM managers include a snapshot data VM manager (e.g., snapshot synthetic VM manager 208 of storage system 102 of FIG. 2), a replica synthetic data VM manager (e.g., replica synthetic data VM manager 210 of storage system 102 of FIG. 2), a shared disk synthetic data VM manager (e.g., shared disk synthetic data VM manager 212 of storage system 102 of FIG. 2), and an abandoned synthetic data VM manager (e.g., abandoned synthetic data VM manager 214 of storage system 102 of FIG. 2). For example, snapshot data associated with VMs may be obtained from a snapshot synthetic data VM manager, replica data associated with VMs may be obtained from a replica synthetic data VM manager, shared disk data associated with VMs may be obtained from a shared disk synthetic VM manager, and abandoned data associated with VMs may be obtained from an abandoned synthetic data VM manager.

At 606, a set of related data associated with a VM ID is determined based on the obtained collected live data and the obtained collected synthetic data. The collected live data (if any) as well as the collected synthetic data associated with the same VM ID are identified and grouped into a set of related data associated with the VM ID.

At 608, it is determined whether the set of related data associated with the VM ID comprises any conflicts. In some embodiments, a conflict exists in the set of related data associated with the VM ID if data collected from different data sources is inconsistent with each other. In the event that the set of related data associated with the VM ID comprises any conflicts, control is transferred to 610. Otherwise, in the event that the set of related data associated with the VM ID does not comprise any conflicts, control is transferred to 612.

At 610, the conflict(s) are resolved using stored data type preference data. In various embodiments, the stored data type preference data comprises a list of data types ordered by their respective preference/priority. Data of a first data type that has a higher preference/priority than a second data type overrides any conflicting data associated with the second data type. In various embodiments, data that is involved in the conflict that is selected to remain in the set of related data is determined based on stored data type preference data.

In some embodiments, the data collected from various data sources may include static attributes associated with the VM ID and dynamic attributes associated with the VM ID. Examples of static attributes associated with the VM ID include a user given name of a VM (which is different from the VM UUID), whether the VM is powered on or off (which is not the same as whether the VM is live or not), a folder associated with the VM, a hypervisor identifier (if any) that is associated with the VM, and file identifiers (IDs) of files that belong to the VM. Examples of dynamic attributes associated with the VM ID include the storage space utilized by the VM (or a vdisk or file thereof), latency associated with the VM, I/Os per second associated with the VM, and a throughput associated with the VM. As such, conflicts with respect to static or dynamic attributes of different data types are resolved using the stored data type preference data. Put another way, one set of static (or dynamic) attributes can be selected to remain in the set of related data associated with the VM ID from among conflicting static (or dynamic) attributes associated with two different data types based on the stored data type preference data.

At 612, associating data that associates the set of related data with the VM ID is stored. After conflicts, if any, are resolved, the remaining set of related data is stored with the VM ID to which it belongs. For example, the set of related data is stored in a data structure or a set of metadata in a manner that is associated with the VM ID.

At 614, it is determined whether a set of related data is to be determined for at least one other VM ID. In the event that it is determined that a set of related data is to be determined for at least one other VM ID, control is transferred to 616, at which a next VM ID for which a set of related data is to be determined is selected. Otherwise, in the event that it is determined that a set of related data is not to be determined for at least one other VM ID, control is transferred to 618.

At 618, sets of related data corresponding to at least a portion of the plurality of VM IDs are presented at a user interface. The set of related data including live and/or synthetic data associated with each VM is presented at a user interface. In the event a VM is associated with live data and synthetic data, then both the live data and synthetic data associated with the VM are simultaneously presented at the user interface. In the event a VM is associated with no live data and only synthetic data, then only the synthetic data associated with the VM is presented at the user interface. Similarly, in the event a VM is associated with only live data and no synthetic data, then only the live data associated with the VM is presented at the user interface. As such, in accordance with some embodiments described herein, the viewing user may simultaneously view the state of a VM including both the live and/or synthetic components of the VM, without having to view the live and synthetic components of the VM in separate user interfaces or having to manually gather the synthetic components of the VM.

The following are example states of a VM that can be presented at the user interface in accordance with some embodiments:

1. If the VM is currently listed in a hypervisor as a "live" VM, then the hypervisor's state determines the primary attributes of a VM (e.g., its user given name, size, file inventory, etc.). Additional collected synthetic data associated with the VM is displayed as an additional "synthetic virtual disk" attached to the VM.

2. If the VM is not owned by any hypervisor, then information in any snapshots or the replication configuration is used. The previously-stored information of the VM's primary attributes (e.g., its user given name, size, file inventory) forms the attributes associated with the VM.

3. If no snapshot or replication information associated with the VM is available, the storage system falls back to cached information about the VM. Every time a VM is created, some of its primary attributes are cached. This cached data comprises synthetic data associated with the VM even if the VM becomes deleted and is not associated with any snapshots or live files. The performance history stored when the VM is in one of the previous two states can still be obtained via this synthetic data.

Figure 7:
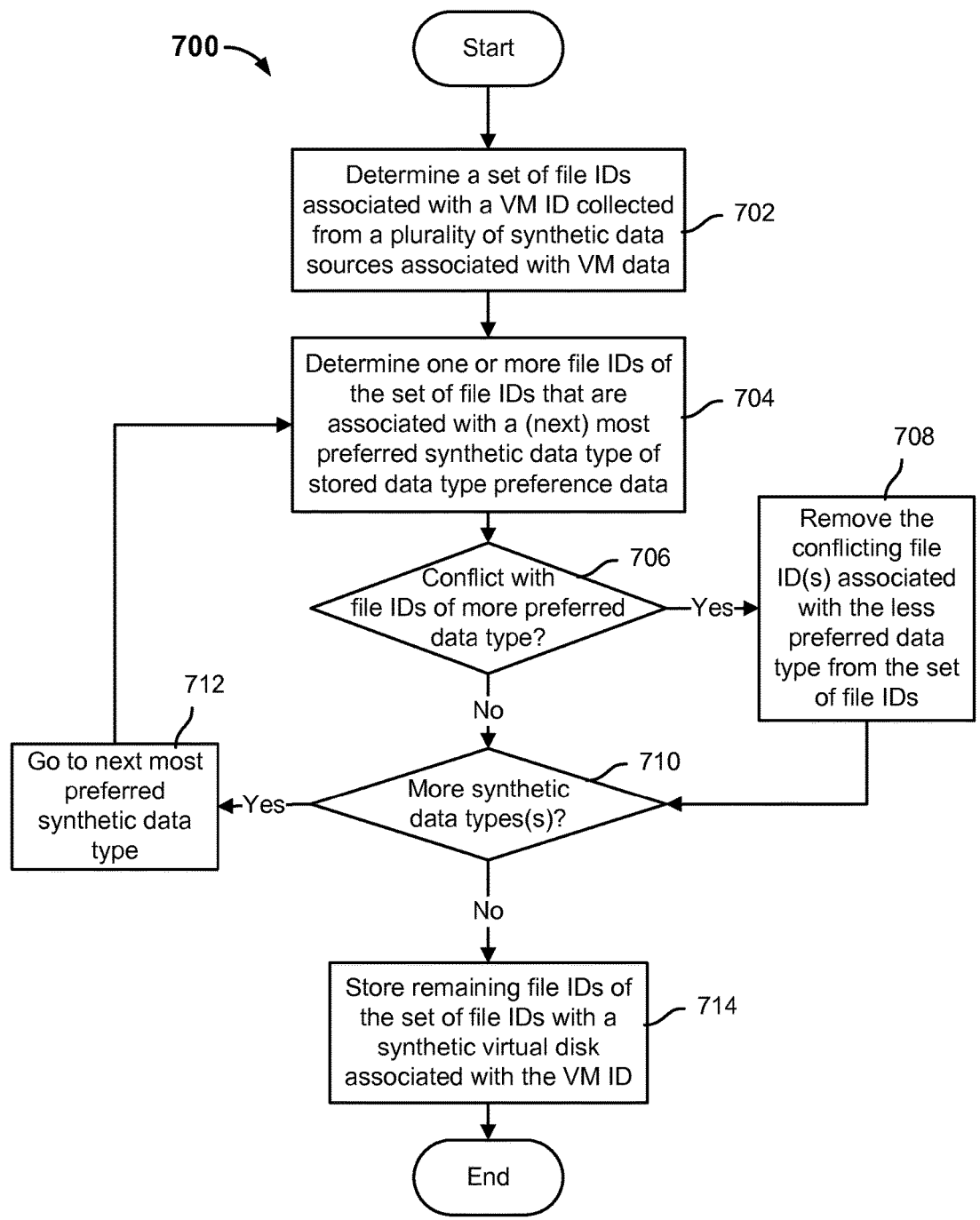
FIG. 7 is a flow diagram showing an embodiment of a process for merging related data and resolving conflict(s) in a set of related data associated with a VM using stored data type preference data.

FIG. 7 is a flow diagram showing an embodiment of a process for merging related data and resolving conflict(s) in a set of related data associated with a VM using stored data type preference data. In some embodiments, process 700 is implemented at a storage system such as storage system 102 of system 100 of FIG. 1. In some embodiments, process 700 is implemented by a master merger VM manager such as master merger VM manager 206 of storage system 102 of FIG. 2. In some embodiments, steps 608, 610, 612, and 614 of process 600 of FIG. 6 are implemented, at least in part, using process 700.

Process 700 describes an example process of merging together, for a VM ID, the synthetic file IDs that have been collected from one or more synthetic data sources and resolving any conflicts among the collected file IDs and also the live file IDs associated with the same VM ID based on their data type. At the end of process 700, the remaining file IDs in the set of files form the synthetic file IDs of the VM ID. In some embodiments, the synthetic file IDs of the VM are stored in a "synthetic virtual disk" associated with the VM ID. In various embodiments, all non-live data (e.g., synthetic data and/or configuration data) associated with a VM ID is associated with a single synthetic virtual disk of the VM ID. Similar to creating a synthetic VM as a placeholder for the synthetic data, the synthetic virtual disk is a placeholder one level "down." It is convenient to view the data either at the VM level or at the vdisk level. The synthetic vdisk ensures that the synthetic data appears in either the VM level view or the vdisk view (and that the synthetic parts of the data can be separated from the live parts of the data). In various embodiments, synthetic virtual disks may differ from the normal virtual disks in one or more of the following ways:

(1) The hypervisor has no state associated with the synthetic virtual disk.

(2) The actual VM cannot read or write a synthetic virtual disk like it can the live virtual disks.

(3) The synthetic VM has an artificial name rather than a hypervisor-assigned name (like "SCSI 0:1" or "virtual_disk_1").

In some embodiments, the synthetic virtual disk of the VM ID can be combined with the live file IDs of the VM ID to form, at least a portion, of the set of related data associated with the VM ID.

At 702, a set of file IDs associated with a VM ID collected from a plurality of synthetic data sources associated with VM data is determined. In various embodiments, the file identifiers (IDs) that belong to a VM ID that are collected from each of various synthetic data sources are determined. The collected file IDs are therefore each associated with a synthetic data type determined based on the synthetic data source from which they were collected. In some embodiments, each file ID is also associated with associated static and/or dynamic attributes determined from the synthetic data source from which it was collected. For example, the synthetic data types of snapshot data, replica data, shared disk data, and abandoned data are collected from non-hypervisor/synthetic data sources. As such, the set of file IDs associated with the VM ID is the set of all file IDs that belong to the VM ID that are collected from one or more synthetic data sources and that may be associated with various synthetic data types.

The file IDs that belong to the VM ID that are collected from one or more live (i.e., hypervisor) data sources have also been separately determined.

Figure 8:
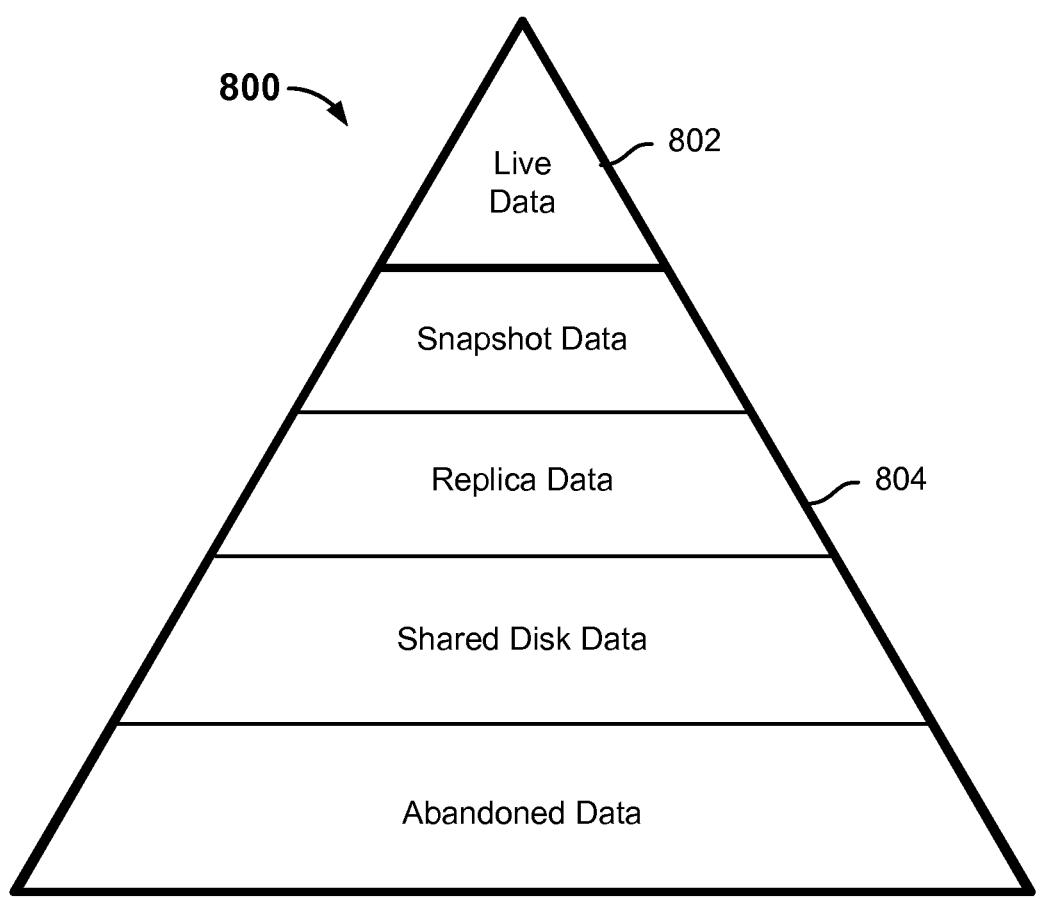
FIG. 8 shows a visual example of data type preference data that illustrates the hierarchy of data types of VM data.

At 704, one or more file IDs of the set of file IDs that are associated with a (next) most preferred synthetic data type of stored data type preference data are determined. The stored data type preference data comprises a list of data types of VM data and their respective order of preference. Put another way, the stored data type preference data comprises a predetermined hierarchy of data types of VM data in which data associated with a data type that is higher in the hierarchy is more preferred and therefore overrides conflicting data associated with a data type that is lower in the hierarchy. FIG. 8 shows a visual example of data type preference data that illustrates the hierarchy of data types of VM data. In the example of FIG. 8, hierarchy 800 shows live data 802 associated with a VM is more preferred than any data type of synthetic data 804 associated with the VM. Data types of synthetic data 804 associated with a VM include snapshot data, replica data, shared disk data, and abandoned data. As such, in the example of FIG. 8, live data 802 associated with a VM is the most preferred data type, snapshot data associated with the VM is the second most preferred data type, replica data associated with the VM is the third most preferred data type, shared disk data associated with the VM is the fourth most preferred data type, and abandoned data associated with the VM is the least preferred data type. As will be described below, the hierarchy of data types of VM data can be used to resolve any conflicts that may be found among a data that is determined for a VM ID.

Process 700 describes an example of resolving conflicts that may be found among a set of files associated with synthetic data that is determined for a VM ID by stepping through each synthetic data type of the data type preference data starting from the most preferred synthetic data type in the hierarchy (704), determining if any file IDs of the set of file IDs that are associated with the most preferred synthetic data type conflict with file IDs associated with the VM ID of a more preferred data type (step 706), removing the conflicting file IDs of the less preferred data type (708), and repeating this process (steps 704, 706, and 708) with the next most preferred synthetic data type of the hierarchy of data types (steps 710 and 712) until all file IDs associated with data types of the set of file IDs that conflict with file IDs of more preferred data types that are associated with the VM ID are removed from the set of file IDs.

At 706, it is determined whether the one or more file IDs of the set of files that are associated with the (next) most preferred synthetic data type conflict with any file IDs associated with the VM ID that are associated with a more preferred data type. In the event that the one or more files of the set of file IDs that are collected from the (next) most synthetic preferred data type conflict with any file IDs of the VM ID that are associated with a more preferred data type, control is transferred to 708. Otherwise, in the event that the one or more file IDs of the set of file IDs that are collected from the (next) most synthetic preferred data type do not conflict with any file IDs of the VM ID that are associated with a more preferred data type, control is transferred to 710.

For example, assuming that the example data type preference data of FIG. 8 is used in the current execution of step 706, the current most preferred synthetic data type is snapshot data, and the current set of files associated with the VM ID includes files 2, 5, and 8 associated with the snapshot data. Assume that the VM ID is also separately associated with files 2, 4, and 5 associated with live data. According to the data type preference data of FIG. 8, live data is more preferred than snapshot data. Because files 2 and 5 from the live data have the same file identifiers as files 2 and 5 from the snapshot data, files 2 and 5 from the live data conflict with files 2 and 5 from the snapshot data. For example, files 2 and 5 that are associated with different data types may comprise different versions of the same files. Given that the data type preference data of FIG. 8 indicates that live data is the most preferred data type and is therefore more preferred over the snapshot data, files 2 and 5 (and any associated static and/or dynamic attributes) from the live data override files 2 and 5 (and any associated static and/or dynamic attributes) associated with the snapshot data. As a result, at 708, files 2 and 5 (and any associated static and/or dynamic attributes) associated with the less preferred snapshot data are removed from the set of file IDs and only file 8 of the snapshot data remains in the set of file IDs to be associated with the synthetic virtual disk of the VM ID.

In another example, in the immediately next execution of step 706, the current most preferred synthetic data type from the example data type preference data of FIG. 8 is replica data, and the remaining set of files associated with the VM ID includes files 8, 9, and 10 associated with the replica data. Assume that the VM ID is still separately associated with files 2, 4, and 5 associated with live data. According to the data type preference data of FIG. 8, both live data and snapshot data are more preferred than replica data. Because remaining file 8 of the snapshot data has the same file identifier as file 8 from the replica data, file 8 from the snapshot data conflicts with file 8 from the replica data. Given that the data type preference data of FIG. 8 indicates that snapshot data is more preferred over the replica data, file 8 (and any associated static and/or dynamic attributes) from the snapshot data overrides file 8 (and any associated static and/or dynamic attributes) associated with the replica data. As a result, file 8 (and any associated static and/or dynamic attributes) associated with the less preferred replica data is removed from the set of file IDs and file 8 (and any associated static and/or dynamic attributes) from the snapshot data is maintained in the set of file IDs to be associated with the synthetic virtual disk of the VM ID.

At 710, it is determined whether there is at least one more synthetic data type in the stored data type preference data. In the event that there is at least one more synthetic data type in the stored data type preference data, control is transferred to 712, at which the next most preferred synthetic data type is selected. Otherwise, in the event that there is no remaining synthetic data type in the stored data type preference data, control is transferred to 714.

At 714, remaining file IDs of the set of file IDs are stored with a synthetic virtual disk associated with the VM ID. By step 714, all file IDs associated with synthetic data types of the set of file IDs that conflict with file IDs of more preferred data types associated with the VM ID are removed from the set of file IDs. As such, by step 714, the file IDs that remain in the set of file IDs do not include any conflicts with more preferred data types and can be stored with the synthetic virtual disk associated with the VM ID in a set of related data associated with the VM ID.

FIGS. 9A through 9D describe an example of collecting data associated with a VM from various data sources in accordance to some embodiments described herein.

Figure 9A:
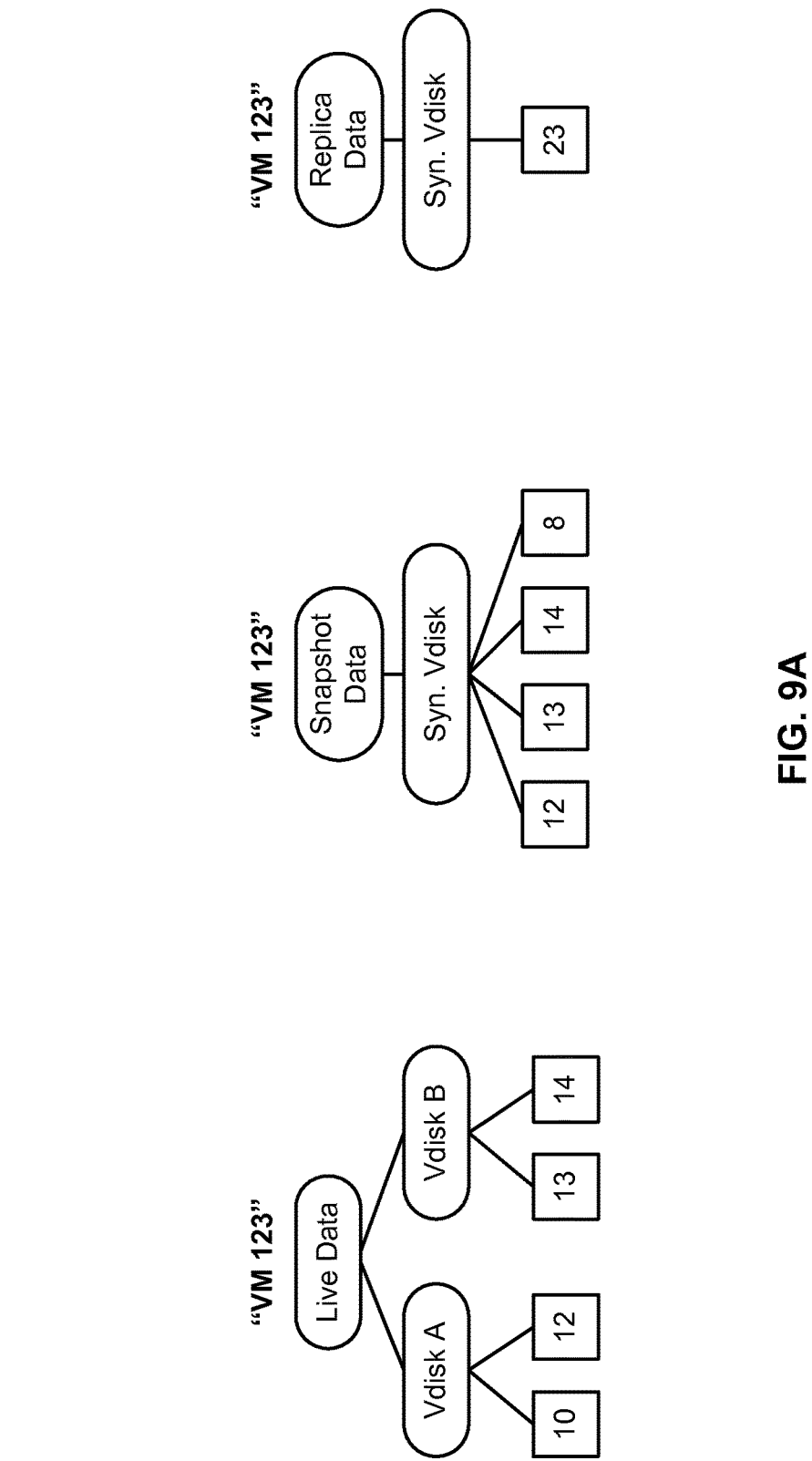
FIG. 9A is a diagram that shows data associated with a VM that is collected from each of three data sources.

FIG. 9A is a diagram that shows data associated with a VM that is collected from each of three data sources. In the example, the VM is identified by its UUID of "123." As shown in FIG. 9A, live data, snapshot data, and replica data associated with VM 123 were collected from three respective data sources. The live data associated with VM 123 includes files 10 and 12 that are associated with VM 123's virtual disk A and files 13 and 14 that are associated with VM 123's virtual disk B. The snapshot data, which is synthetic data, associated with VM 123 includes files 12, 13, 14, and 8, and is associated with VM 123's synthetic virtual disk. The replica data, which is also synthetic data, associated with VM 123 includes file 23 and is associated with VM 123's synthetic virtual disk. While not shown in the diagram, each file ID in each of the live data, snapshot data, and/or replica data is associated with static and/or dynamic attributes associated with that file that were determined from the data source from which it was collected. For example, file 10 associated with virtual disk A of the live data may be associated with a static attribute such as the user given name for file 10 and a dynamic attribute such as an amount of storage space consumed by file 10.

Figure 9B:
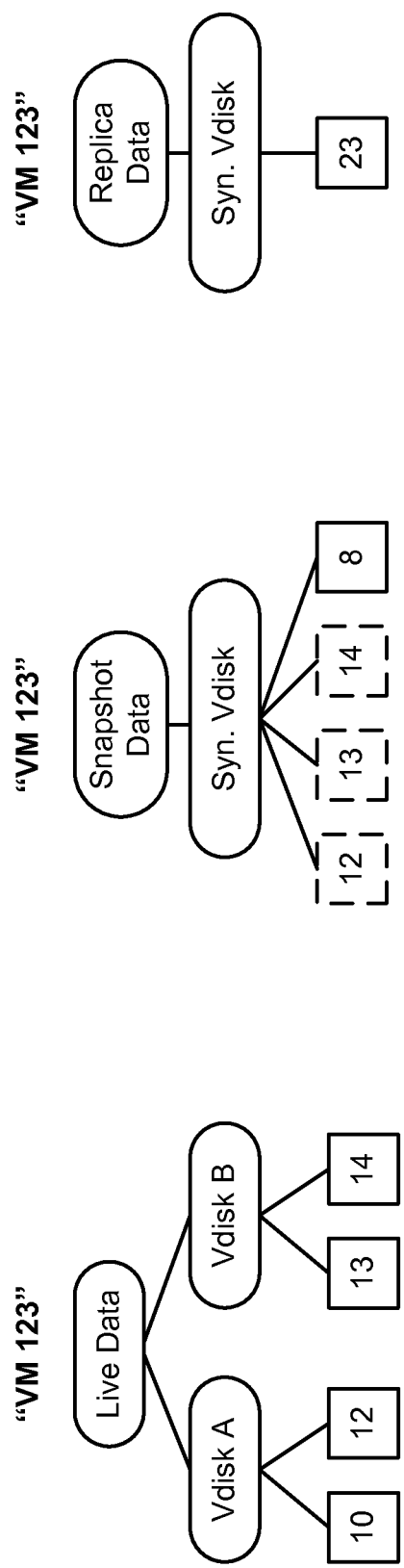
FIG. 9B is a diagram that shows merging the data associated with the VM that is collected from the three data sources.

FIG. 9B is a diagram that shows merging the data associated with the VM that is collected from the three data sources. The file IDs associated with VM 123 from the live data, snapshot data, and replica data can be merged into a set of related data associated with VM 123 using a process such as process 600 of FIG. 6. Resolving conflict(s) in the set of related data associated with VM 123 using stored data type preference data can be performed using a process such as process 700 of FIG. 7. Applying process 700 to the example, the set of all file IDs associated with the synthetic data collected for VM 123 including snapshot data and replica data includes files 12, 13, 14, and 8 associated with the snapshot data and file 23 associated with the replica data. Because files 12, 13, and 14 appear in both the live data and the snapshot data associated with VM 123, these files conflict. To resolve these conflicts, stored data type preference data is looked up to determine the hierarchy of data types of VM data. Referring to the example data type preference data that illustrates a hierarchy of data types of VM data of FIG. 8, it is determined that live data is more preferred than snapshot data and that snapshot data is more preferred than replica data. As such, conflicting files 12, 13, and 14 (and any associated static and/or dynamic attributes) associated with the snapshot data are overridden by the corresponding files 12, 13, and 14 associated with the live data and therefore, conflicting files 12, 13, and 14 (and any associated static and/or dynamic attributes) associated with the snapshot data are removed from the set of all file IDs associated with the synthetic data collected for VM 123. After the removal of conflicting files 12, 13, and 14 (and any associated static and/or dynamic attributes) associated with the snapshot data from the set of all file IDs associated with the synthetic data collected for VM 123, the set of related data associated with VM 123 includes files 10, 12, 13, and 14 associated with the live data, file 8 associated with the snapshot data, and file 23 associated with the replica data. The stored set of related data associated with VM 123 may also include static and/or dynamic attributes of VM 123 and/or each file ID thereof.

Figure 9C:
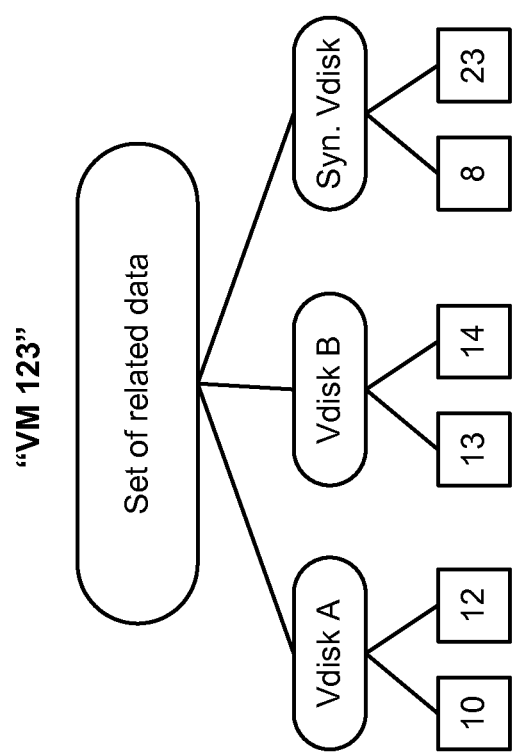
FIG. 9C is a diagram that shows file IDs of the determined set of related data associated with the VM.

FIG. 9C is a diagram that shows file IDs of the determined set of related data associated with the VM. As a result of the merging and data conflict resolution of data associated with VM 123 that was collected from different data sources, the determined set of related data associated with VM 123 includes both live components and synthetic components. The live components of VM 123 include files 10 and 12 associated with VM 123's virtual disk A and files 13 and 14 associated with VM 123's virtual disk B. The synthetic components of VM 123 include files 8 and 23 associated with VM 123's synthetic virtual disk.

FIG. 9D is a diagram that shows an example presentation of the set of related data associated with the VM at a user interface. In response to a request to view the states of VMs such as VM 123, the set of related data associated with VM 123 that was described with FIG. 9C can be presented at a user interface. As described in FIG. 9C, VM 123 is associated with both live components and synthetic components. As such, the presentation of the set of related data associated with VM 123 simultaneously shows both the live components and synthetic components of VM 123. In the example presentation, the presented live components of VM 123 include files 10, 12, 13, and 14 and each file ID's respective locations and space usage. Similarly, the presented synthetic components of VM 123 include files 8 and 23 and each file ID's respective locations and space usage. A user that views the presentation can quickly see that VM 123 has both live and synthetic components and that the synthetic components of the VM take up a significant amount of storage, which the user would not have otherwise known just by observing the live components of the VM. While not shown in the diagram of FIG. 9D, in some embodiments, the user interface may also present selectable elements that once selected, enable a user to apply a uniform action (e.g., cloning, deletion, migration) across all live and synthetic components of VM 123.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
    collect a first set of data associated with a plurality of virtual machines from a plurality of non-hypervisor data sources of virtual machine data, wherein the first set of data associated with the plurality of virtual machines is not currently tracked by a hypervisor, wherein the first set of data associated with the plurality of virtual machines that is not currently tracked by the hypervisor comprises data that has been removed from an inventory associated with the hypervisor;
    collect a second set of data associated with the plurality of virtual machines from a hypervisor data source of virtual machine data;
    create a set of related data associated with a virtual machine among the plurality of virtual machines based at least in part on combining at least a portion of the first set of data associated with the plurality of virtual machines collected from the plurality of non-hypervisor data sources of virtual machine data and at least a portion of the second set of data associated with the plurality of virtual machines collected from the hypervisor data source of virtual machine data;
    store associating data that associates the set of related data associated with the virtual machine;
    present, at a user interface, the set of related data associated with the virtual machine based at least in part on the associating data;
    determine storage space utilized by the virtual machine based on the set of related data associated with the virtual machine; and
    perform at least one of cloning, deletion, and migration of at least a portion of the virtual machine based at least in part on the utilized storage space; and
a storage device coupled to the processor and configured to store the set of related data associated with the virtual machine.

2. The system of claim 1, wherein the first set of data associated with the plurality of virtual machines comprises snapshot data.

3. The system of claim 1, wherein the first set of data associated with the plurality of virtual machines comprises replica data.

4. The system of claim 1, wherein the first set of data associated with the plurality of virtual machines comprises shared disk data.

5. The system of claim 1, wherein the first set of data associated with the plurality of virtual machines comprises abandoned data.

6. The system of claim 1, wherein the plurality of non-hypervisor data sources of virtual machine data comprises a first non-hypervisor data source of virtual machine data and wherein the processor is further configured to collect data associated with the plurality of virtual machines from a second non-hypervisor data source of virtual machine data.

7. The system of claim 6, wherein to create the set of related data associated with the virtual machine includes to merge data associated with the virtual machine that is collected from the first non-hypervisor data source of virtual machine data and data associated with the virtual machine that is collected from the second non-hypervisor data source of virtual machine data into the set of related data.

8. The system of claim 7, wherein to merge the data associated with the virtual machine that is collected from the first non-hypervisor data source of virtual machine data and the data associated with the virtual machine that is collected from the second non-hypervisor data source of virtual machine data into the set of related data comprises to:
   determine that data associated with a first data type from the first non-hypervisor data source conflicts with data associated with a second data type from the second non-hypervisor data source; and
   maintain one of the data associated with the first data type from the first non-hypervisor data source and the data associated with the second data type from the second non-hypervisor data source based at least in part on stored data type preference data.

9. The system of claim 1, wherein the first set of data associated with the plurality of virtual machines includes at least one of a static attribute associated with the virtual machine and a dynamic attribute associated with the virtual machine.

10. The system of claim 1, wherein the plurality of non-hypervisor data sources of virtual machine data comprises one or more of the following: a filesystem of a storage system, stored snapshot data, incoming replication information, a configuration management tool of the storage system, an orchestration service of the storage system, and a local cache of the storage system.

11. A method, comprising:
   collecting a first set of data associated with a plurality of virtual machines from a plurality of non-hypervisor data sources of virtual machine data, wherein the first set of data associated with the plurality of virtual machines is not currently tracked by a hypervisor, wherein the first set of data associated with the plurality of virtual machines that is not currently tracked by the hypervisor comprises data that has been removed from an inventory associated with the hypervisor;
   collecting a second set of data associated with the plurality of virtual machines from a hypervisor data source of virtual machine data;
   creating a set of related data associated with a virtual machine among the plurality of virtual machines based at least in part on combining at least a portion of the first set of data associated with the plurality of virtual machines collected from the plurality of non-hypervisor data sources of virtual machine data and at least a portion of the second set of data associated with the plurality of virtual machines collected from the hypervisor data source of virtual machine data;
   storing associating data that associates the set of related data associated with the virtual machine;
   presenting, at a user interface, the set of related data associated with the virtual machine based at least in part on the associating data;
   determining storage space utilized by the virtual machine based on the set of related data associated with the virtual machine; and
   performing at least one of cloning, deletion, and migration of at least a portion of the virtual machine based at least in part on the utilized storage space.

12. The method of claim 11, wherein the plurality of non-hypervisor data sources of virtual machine data comprises a first non-hypervisor data source of virtual machine data and further comprising collecting data associated with the plurality of virtual machines from a second non-hypervisor data source of virtual machine data.

13. The method of claim 12, wherein creating the set of related data associated with the virtual machine includes merging data associated with the virtual machine that is collected from the first non-hypervisor data source of virtual machine data and data associated with the virtual machine that is collected from the second non-hypervisor data source of virtual machine data into the set of related data.

14. The method of claim 13, wherein merging the data associated with the virtual machine that is collected from the first non-hypervisor data source of virtual machine data and the data associated with the virtual machine that is collected from the second non-hypervisor data source of virtual machine data into the set of related data comprises:
   determining that data associated with a first data type from the first non-hypervisor data source conflicts with data associated with a second data type from the second non-hypervisor data source; and
   maintaining one of the data associated with the first data type from the first non-hypervisor data source and the data associated with the second data type from the second non-hypervisor data source based at least in part on stored data type preference data.

15. The method of claim 11, wherein the first set of data associated with the plurality of virtual machines includes at least one of a static attribute associated with the virtual machine and a dynamic attribute associated with the virtual machine.

16. A computer program product, the computer program product being embodied in a non-transitory computer readable storage medium and comprising computer instructions for:
   collecting a first set of data associated with a plurality of virtual machines from a plurality of non-hypervisor data sources of virtual machine data, wherein the first set of data associated with the plurality of virtual machines is not currently tracked by a hypervisor, wherein the first set of data associated with the plurality of virtual machines that is not currently tracked by the hypervisor comprises data that has been removed from an inventory associated with the hypervisor;
   collecting a second set of data associated with the plurality of virtual machines from a hypervisor data source of virtual machine data;

creating a set of related data associated with a virtual machine among the plurality of virtual machines based at least in part on combining at least a portion of the first set of data associated with the plurality of virtual machines collected from the plurality of non-hypervisor data sources of virtual machine data and at least a portion of the second set of data associated with the plurality of virtual machines collected from the hypervisor data source of virtual machine data;

storing associating data that associates the set of related data associated with the virtual machine;

presenting, at a user interface, the set of related data associated with the virtual machine based at least in part on the associating data;

determining storage space utilized by the virtual machine based on the set of related data associated with the virtual machine; and performing at least one of cloning, deletion, and migration of at least a portion of the virtual machine based at least in part on the utilized storage space.

17. The system of claim 1, wherein to create the set of related data associated with the virtual machine based at least in part on the first set of data associated with the plurality of virtual machines collected from the plurality of non-hypervisor data sources of virtual machine data and the second set of data associated with the plurality of virtual machines collected from the hypervisor data source of virtual machine data comprises to merge together the first set of data associated with the plurality of virtual machines and the second set of data associated with the plurality of virtual machines.

18. The system of claim 17, wherein to merge together the first set of data associated with the plurality of virtual machines and the second set of data associated with the plurality of virtual machines comprises to:

determine that a first portion of data associated with the first set of data associated with the virtual machine conflicts with a second portion of data associated with the second set of data associated with the virtual machine; and maintain one of the first portion of data associated with the first set of data and the second portion of data associated with the second set of data based at least in part on stored data type preference data.

19. The method of claim 11, wherein creating the set of related data associated with the virtual machine based at least in part on the first set of data associated with the plurality of virtual machines collected from the plurality of non-hypervisor data sources of virtual machine data and the second set of data associated with the plurality of virtual machines collected from the hypervisor data source of virtual machine data comprises merging together the first set of data associated with the plurality of virtual machines and the second set of data associated with the plurality of virtual machines.

20. The method of claim 19, wherein merging together the first set of data associated with the plurality of virtual machines and the second set of data associated with the plurality of virtual machines comprises:

determining that a first portion of data associated with the first set of data associated with the virtual machine conflicts with a second portion of data associated with the second set of data associated with the virtual machine; and maintaining one of the first portion of data associated with the first set of data and the second portion of data associated with the second set of data based at least in part on stored data type preference data.

* * * * *